Dec. 2, 1969    L. A. WELLEN    3,481,818
EMBOSSED LAMINATED PLASTIC PANEL AND METHOD OF MAKING SAME
Filed Sept. 29, 1964
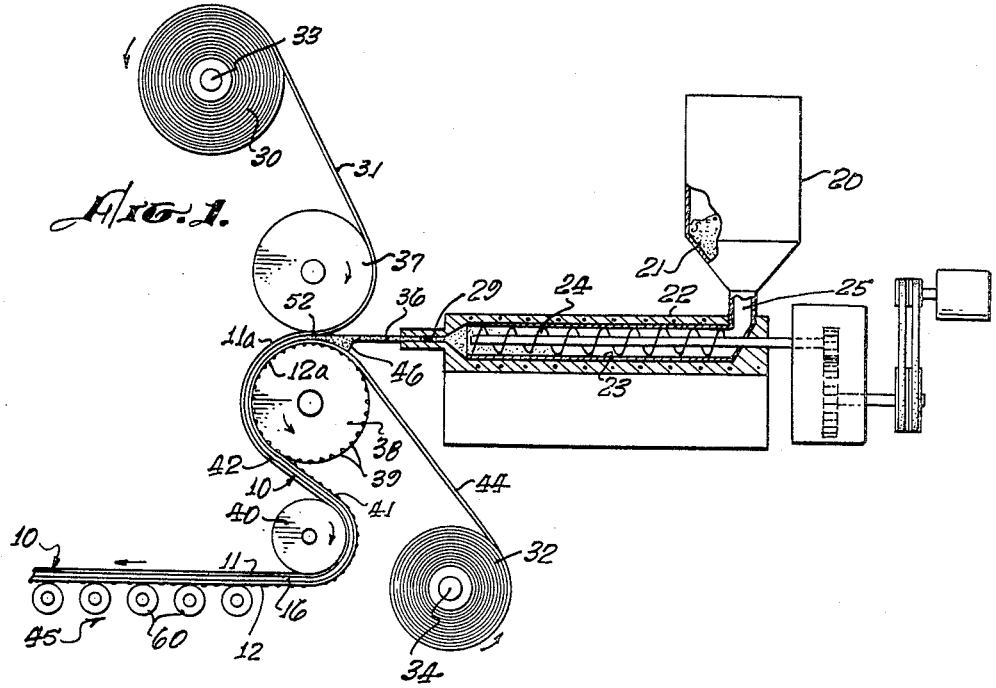
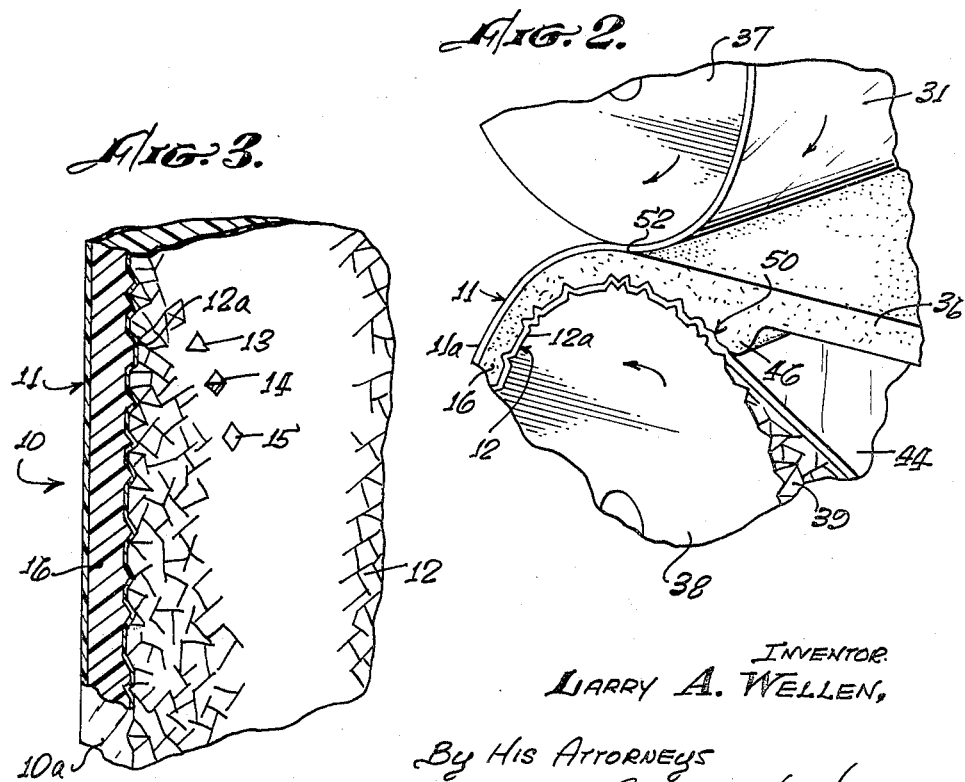
INVENTOR.
LARRY A. WELLEN,
By His Attorneys
Spensley & Horn.

United States Patent Office 3,481,818
Patented Dec. 2, 1969

3,481,818
EMBOSSED LAMINATED PLASTIC PANEL AND METHOD OF MAKING SAME
Larry A. Wellen, San Pedro, Calif., assignor to Carolite Inc., Gardena, Calif., a corporation of California
Filed Sept. 29, 1964, Ser. No. 400,182
Int. Cl. B32b 31/06, 31/30
U.S. Cl. 161—2                    5 Claims

ABSTRACT OF THE DISCLOSURE

A laminated sheet structure comprising an extruded styrene plastic core sheet having fused to both surfaces thereof a biaxially oriented styrene film. The laminate is translucent and is smooth on one side and has triangular pyramidal or diamond-shaped embossments on the other side. The laminate is made by applying thin film sheets of biaxially oriented polystyrene to an extruded styrene sheet. The combined thin film sheets and extrudate sheet are than forced between a pair of juxtaposed rollers, the lower roller of the pair having embossed projections distributed in predetermined patterns. The embossing projections are pressed into one side of the laminate sheet.

---

This invention relates to the fabrication of plastic laminated sheet material and in particular to an extruded styrene plastic sheet core having fused to both surfaces thereof a biaxially oriented styrene film.

Translucent panels of polyvinyl, acrylic and styrene plastics are well known to the plastics art as rigid plastics and each of the materials has advantages and disadvantages for particular purposes. Styrene polymers, copolymers and compounds have many outstanding features which make styrene one of the most popular plastics for many uses. It is the lightest in unit weight of presently commercially available rigid plastics. Since the basic styrene resin is colorless, the polymer can be made crystal clear or in an unlimited range of colors. Excellent dimensional stability combined with negligible moisture absorption and freedom from warping or distortion within the thermal operating range make the polystyrenes particularly useful. However, styrene panels are frangible and for purposes in which tensile strength has been required styrene has been unsatisfactory. Various attempts at laminations or other solutions for increasing the strength and shatter resistance of styrene have been economically unsuccessful. For example, for use as panels in shower doors and for like purposes, styrene has been unsatisfactory as a panel material since it is too easily shattered or broken. For shower doors, wire or metal reinforced glass has been used and the only suitable plastic panels have been formed of acrylic and vinyl. All of these materials are very expensive compared to styrene.

The present invention provides a new laminated styrene plastic panel or sheet material which can be fabricated by the method of the present invention is continuous sheet form to be shatter resistant and to have decorative patterns embossed on one of its surfaces so as to provided desirable and advantageous light control properties whether whether used as translucent or quasi-opaque windows and doors or as lighting fixture accessories. The new laminate is more versatile in its utility and more economical in manufacture since all excess waste materials resulting from the manufacture are compatible with the basic core material which is plasticized to form the extrudate. Therefore the excess and waste material can be comminuted with the granular starting material and replasticized despite the fact that the biaxially oriented laminar film had already been fused thereto. The resulting product is homogeneous.

Biaxially oriented styrene film is commercially available and is biaxially oriented, as discussed hereinafter, by extrusion methods. The film is available in standard width sheets and gages from 0.003 to 0.020 inch. The biaxial orientation of this material imparts toughness and provides for long life and economy in thin film form. If is unaffected by temperatures as high as 185° F. and as low as −60° F.

Accordingly, it is an object of this invention to provide a novel laminate of styrene extrudate with a compatible biaxially oriented styrene film fused to both surfaces thereof to form a homogeneous sheet textured on at least one surface.

It is a further object of the invention to provide a light stable laminate of homogeneous materials wherein at least one of the surfaces of the extrudate is embossed during the fusion thereof with a laminar film of a substance compatible with said extrudate to provide a controlled translucency in said laminate.

It is another object of this invention to provide a method of producing a homogeneous polymeric laminate wherein by the control of temperatures of respective rollers through which the extrudate and laminar films forming the laminate sheet are fused, the desired characteristics of the new product are achieved.

Another object of the present invention is to provide a laminated styrene panel material which is economical of manufacture.

A further and principal object of the present invention is to provide a laminated styrene sheet material which is shatter resistant.

Yet another object of the present invention is to provide a laminated styrene sheet material in which the laminations are substantially invisible and in which the components forming the laminated structure are compatible for reclamation.

These and other objects of the invention will be more clearly understood from description which follows in which a preferred embodiment thereof is described, but which should not be construed as limited to that embodiment because those skilled in this art will be able to apply the teachings of this invention in other ways within the scope of the appended claims when taken together with the following specification and the drawing in which:

FIGURE 1 is a cross-sectional representation of the new product showing its construction;

FIGURE 2 is an enlarged fragmentary perspective of the sheet in process of manufacture;

FIGURE 3 is a perspective view of a fragment of the product.

The new product according to this invention is a laminated sheet as shown in cross-sectional form at 10 in FIGURE 1 and in a fragmentary perspective view in FIGURE 3. The finished sheet is smooth on one surface as indicated at 11 and textured on the obverse side as indicated at 12. While in the illustrations triangular, pyramidal or diamond-shaped indentations or embossments are shown as at 12, 14 and 15 any desired indentations design pattern may be impressed or embossed in the surface during the processes of extrusion and lamination as hereinafter described. The choice of design is determined both by the desired light control or translucency characteristics sought to be achieved in the implementation and use of the invention and by aesthetic considerations. The combinations of utilitarian pattern and aesthetic design are many and varied.

To the right of the cross-sectional portion of a laminated sheet according to this invention there is shown the basic condition of the laminate composite 10a during the process of adhesion between the two laminar sheet films 11a and 12a. During the fusion and cooling phase of the process the extrudate core material 16 and the upper and lower laminar sheets 11a and 12a adhere to one another as indicated at 10a and when passed between the embossing roller 38 and smooth roller 37 described below, the entire sheet becomes as one fused homogeneous mass as shown at 10 with a flat top surface 11 and the embossed or textured surface 12. The core material 16 is general purpose styrene and in the embodiment shown is approximately ⅛ inch in thickness. The laminar sheets 11 and 12 are fused to the core and are biaxially oriented styrene film approximately 0.010 inch in thickness in the presently preferred embodiment. After fusion to the core the laminar sheets 11 and 12 retain their biaxial orientation.

In FIGURE 1 the mechanism for processing and producing the laminate sheet of this invention is shown in a generally schematic form. In the figure a hopper 20 is employed to receive granular general purpose polystyrene polymeric plasticizable material 21 which is heated by a heating jacket 22 surrounding cylinder 23. A worm gear screw 24 is provided in a cooperative relation with cylinder 23 plus heating jacket 22. The plasticizable material enters cylinder 23 through a communicating orifice 25 beneath hopper 20. The screw 24 then expels the plastic extrudate 36 out of an elongated extrusion aperture 29 at the end of the chamber opposite hopper 20. Alternative methods and means to extrude the plasticized extrudate into and out of the cylinder 23 will be apparent to those skilled in the art.

A typical material 21 which may be used in hopper 20 for the product and process of this invention is known commercially as Lustrex a registered trademark of the Monsanto Chemical Company of Springfield, Mass. The temperature maintained in the chamber is maintained such that at expulsion of the plastic 36 from aperture 29 the temperature is 340° F. in the presently preferred embodiment. The extrudate 36 as it leaves elongated extrusion aperture 29 immediately begins to cool.

From a first elongated supply roll 30 rotatably journaled on an axis 33 a thin plastic film of a material 31 compatible with the above mentioned styrene core, is payed out to an upper elongated heated roller 37.

From a second elongated supply roll 32 journaled rotatably on an axis 34 a second thin plastic film 44 is payed out over a lower elongated heated roller 38. Roller 38 has a great many projections 39 of predetermined shape. The projections 39 cover the entire surface of roller 38 and may be in randoms or patterned configurations and designs.

Extrudate 36 in being expelled from aperture 29 is forced against plastic film 44 and roller 38 in which process due to the gravitational forces thereon a bead roll 46 forms which, due to the fact that roller 38 is hot but cooler than the extrudate 36, does not break but remains soft and reforms at 50 joining with the plastic film 44 and fusing therewith at the adjunct surfaces of extrudate 36 and film 44 coming together at 50. The bead roll 46 holds because of surface tension.

It has been found that the size of the bead 46 as well as its temperature is critical in maintaining a proper laminate. If the bead size is too small improper and incomplete fusion of the lower film 44 results since there is insufficient feed material available for the embossed surface and insufficient pressure created for fusion. If the bead is too large an irregular surface results in that the rollers are forced to push too much material and the bead turns over causing transverse rolls in the surface of the product. A bead size of ⅛ inch to ⁷⁄₁₆ inch is satisfactory and in the present embodiment a ¼ inch diameter bead. The thickness of the core in the present embodiment is approximately ⅛ inch.

There are certain important temperature considerations which have been found to make the product of this invention possible. In a practical embodiment of the invention it has been found that the best point of lamination as represented by the junctions 50 and 52 of extrudate 36 and films 31 and 44 under juxtaposed rollers 37 and 38 is approximately 8 inches or less from the extrusion die aperture or lip 29. It has also been found that the extrudate temperature is critical at approximately 340° F. The upper or smooth surface roller 37 is best maintained at a temperature of 192° F., while the lower textured embossing roller 38 must be within at least 10° F. lower or about 181° F. The roll temperatures must be maintained within 10° F. of their predetermined temperatures. The reasons for this are more fully defined below.

The films 31 and 44 are biaxially oriented in their molecular structures. The orientation is established during the manufacture of the film by a process of stretching during sheet formation first in one dimension and then at 90° F. from the first dimensional stretch.

If the temperatures of rollers 37 and 38 are not maintained at the critical values above set forth, the film will not be usable in the manner contemplated in this invention. Should the rollers be too hot the biaxial orientation of the films 31 and 44 will be destroyed. The disoriented sheet shrinks and becomes brittle and will not provide the shatterproof characteristics of the finished laminate 10 which is the principal features of the new material. Should the rollers 37 and 38 become too cold the lamination of the films 31 and 44 to the extrudate 36 will not take place. The bead 46 transfers more heat to film 44 causing greater deorientation than film 31.

At the instant of lamination the maximum degree of orientation of the film is momentarily lost but as the films 31 and 44 now on either side of the cooling extrudate and fusing therewith pass around roller 38 the embossing action of projections 39 restretches the film and reorients the molecular structure of the film 44 biaxially, thus returning to the film its particular characteristics desirable in the shatterproofing of the final laminate.

As the material joins together over roller 38 the warmer surface of roller 37 maintains the outer surface 42 of the laminated sheet 10 coming off roller 38 around idler roller 40 sufficiently softer than embossed surface 41 that surface 42 tends to flow slightly, forming a smooth surface while the cooler embossing roller 38 reduces the tendency towards to return to the smooth state and by the time surface 41 leaves roller 38 it has set in the embossed pattern although the entire laminate 10 is still soft enough to roll readily about idler roller 40. The laminated sheet falls upon a cooling, or drying, or curing table 45 which may have rollers 60 in the surface thereof to facilitate transport thereof to storage beyond table 45 but not shown.

There has been described above a method by which a new shatterproof plastic laminate sheet material having a smooth surface on one face and a textured surface on the opposite face thereof is formed. The new material in a preferred form thereof is rendered shatter-proof by the fusion of two biaxially oriented polystyrene films on either surface of a styrene extrudate through a pair of rollers. The materials of the film and extrudate are compatible. The upper roller of the pair is held at a first predetermined temperature while the lower roller is held at a second predetermined temperature approximately 10° F. lower than the upper roller temperature. The lower roller has a surface with embossing elements projecting from the surface thereof in a uniform or random pattern as may be desired. The extrudate at a third predetermined temperature substantially higher than both said first and said second predetermined temperatures is extruded over a predetermined distance from an extrusion die to said two rollers between the two films. The films and extrudate fuse while the lower roller embosses the predetermined pattern into one of the surfaces. The fused laminate embossed on one surface and smooth on the other passes over an idler roller and is land upon a drying or curing table while rolling to a storage area. The shape, size and distribution pattern of the embossments in the embossed surface of the laminated sheet provide means whereby light control characteristics and translucency of the laminate are predetermined.

As an example of the relative shatterproof qualities of the material of the present invention as compared to that of acrylic sheet material, impact and deflection tests have been conducted. The test was such that impact loading was conducted with the use of a 60 pound sand bag. The sand bag was 10 inches in diameter with a flat impact face. An acrylic sheet and a sheet of the material of the present invention were mounted in shower door frames and positioned horizontally. When the sand bag was dropped in free fall from 18 inches onto the geometric center of the acrylic sheet the sheet shattered. Comparably the sheet of the present invention did not fail until the drop distance was 36 inches and the failure was then by the sand bag punching through the material but without shattering.

What is claimed is:

1. A translucent plastic panel comprising:
    a core sheet of extruded polystyrene having first and second opposed parallel surfaces, first and second sheets of biaxially oriented styrene fused to said first and second surface of said core sheet, said first surface being substantially planar and said second surface being embossed.

2. The translucent plastic panel of claim 1 in which the core sheet is a substantially planar extruded sheet of polystyrene and said first and second sheets are biaxially oriented styrene film approximately 0.010 inch in thickness.

3. The translucent plastic panel of claim 2 in which said core sheet is approximately ⅛ inch in thickness.

4. A method of manufacture of a shatterproof translucent plastic laminate sheet material of predetermined light controlling and translucency characteristics, said method comprising the steps of:
    extruding a plasticized polymer from a sheet extrusion die over a path extending from said die over a distance of approximately eight inches to form an extrudate sheet;
    applying a first thin film sheet of biaxially oriented polymer compatible with said extrudate polymer to the upper surface of said extrudate sheet;
    applying a second thin film sheet of biaxially oriented polymer compatible with said extrudate polymer to the lower surface of said extrudate sheet;
    rolling both said thin film sheets and said extrudate sheet between a pair of juxtaposed rollers at the terminal end of said distance of eight inches from said extrusion die, the upper roller of said pair being smooth and being maintained at a first predetermined temperature and the lower roller of said pair having embossing projections distributed in predetermined patterns thereon and being maintained at a predetermined temperature lower than said first predetermined temperature thereby fusing both said thin film sheets to said extrudate sheet to form a homogeneous laminate sheet; and
    embossing said projections in said predetermined pattern into one side of said homogeneous laminate sheet to form a texture of embossments therein and the other side of said sheet being smooth wherein said fusing and embossing are preformed without deorientating said biaxially oriented sheets.

5. A method of manufacture of a shatterproof, translucent plastic laminate sheet material of predetermined light controlling and translucency characteristics, said method comprising the steps of:
    plasticizing styrene material at a temperature of approximately 340° F.;
    extruding said plasticized styrene from a sheet extrusion die over a path extending from said die over a distance of approximately eight inches or less to form an extrudate sheet;
    applying thin film sheets of biaxially oriented polystyrene compatible with said styrene to both surfaces of said extrudate sheet;
    forcing said combined thin film sheets and said extrudate sheet between a pair of juxtaposed rollers at the terminal end of said distance of approximately eight inches from said extrusion die, the upper roller of said pair being smooth and being maintained at a temperature of 192° F.±10° F., and the lower roller of said pair having embossing projections distributed in predetermined patterns thereon and being maintained at a temperature of 181° F.±10° F. thereby fusing said respective thin film sheets to opposite faces of said extrudate sheet to form a homogeneous laminate sheet, said embossing projections being pressed into one side of said homogeneous laminate sheet to form a texture of embossments therein and the other side of said sheet being smooth wherein said fusing and embossing are performed without deorientating said biaxially oriented sheets; and
    passing said laminate sheet over a drying and curing plate to form the finished laminate.

References Cited

UNITED STATES PATENTS

| 2,392,594 | 1/1946 | Karfiol et al. | 156—209 XR |
| 2,429,340 | 10/1947 | Bailey. | |
| 2,477,300 | 7/1949 | Karfiol et al. | 156—220 XR |
| 2,810,423 | 10/1957 | Longstreth et al. | 161—252 XR |
| 2,865,046 | 12/1958 | Bird | 264—47 |
| 2,976,567 | 3/1961 | Jones et al. | 264—284 XR |
| 3,116,194 | 12/1963 | Looser | 156—500 |
| 3,160,917 | 12/1964 | Berggren et al. | 264—289 |

FOREIGN PATENTS

| 883,396 | 11/1961 | Great Britain. |

ROBERT F. BURNETT, Primary Examiner

WILLIAM A. POWELL, Assistant Examiner

U.S. Cl. X.R.

101—22, 32; 156—209, 244, 324, 500; 161—119, 164, 402, 413; 264—284